United States Patent
Yamanaka et al.

(10) Patent No.: US 9,181,598 B2
(45) Date of Patent: Nov. 10, 2015

(54) ALLOYED HOT-DIP GALVANIZED STEEL SHEET

(71) Applicant: Nippon Steel & Sumitomo Metal Corporation, Tokyo (JP)

(72) Inventors: Shintaro Yamanaka, Tokyo (JP); Soshi Fujita, Tokyo (JP); Koichi Sato, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/348,247

(22) PCT Filed: Sep. 28, 2012

(86) PCT No.: PCT/JP2012/075198
§ 371 (c)(1),
(2) Date: Mar. 28, 2014

(87) PCT Pub. No.: WO2013/047810
PCT Pub. Date: Apr. 4, 2013

(65) Prior Publication Data
US 2014/0255725 A1  Sep. 11, 2014

(30) Foreign Application Priority Data

Sep. 30, 2011 (JP) ................ 2011-217145

(51) Int. Cl.
*B32B 15/04* (2006.01)
*B32B 15/18* (2006.01)
(Continued)

(52) U.S. Cl.
CPC ............. *C21D 8/0263* (2013.01); *B21B 3/00* (2013.01); *B32B 15/01* (2013.01); *B32B 15/013* (2013.01);
(Continued)

(58) Field of Classification Search
CPC ...... C22C 38/58; C22C 38/002; C22C 38/04; C22C 38/00; C22C 38/06; C22C 38/001; C22C 38/02; C23C 2/06; C23C 2/28; C23C 2/02; C23C 2/26; B32B 15/013; B32B 15/01; B32B 15/18; Y10T 428/12799; Y10T 428/12958; Y10T 428/12972; Y10T 428/2495; Y10T 428/24967; Y10T 428/24942
USPC .......................................... 428/659
See application file for complete search history.

(56) References Cited

U.S. PATENT DOCUMENTS

2005/0081966 A1   4/2005  Kashima et al.
2011/0162762 A1*  7/2011  Matsuda et al. ............ 148/533

FOREIGN PATENT DOCUMENTS

EP     1 978 113    8/2008
JP     10-088309    7/1998
(Continued)

OTHER PUBLICATIONS

Machine Translation, Azuma et al., JP 2007-231373, Sep. 2007.*
(Continued)

*Primary Examiner* — Michael E La Villa
(74) *Attorney, Agent, or Firm* — Kenyon & Kenyon LLP

(57) ABSTRACT

A high-strength alloyed hot-dip galvanized steel sheet obtained by subjecting the surface of a high-strength steel sheet to alloyed hot-dip galvanization, and formed from a steel sheet containing, in mass %, main components, and containing at least 40 vol % bainite and/or martensite, 8-60 vol % retained austenite, and less than 40 vol % ferrite, with the remainder comprising unavoidable structures. In the alloyed hot-dip galvanized steel sheet, the total thickness of the Gamma1 layer and the Gamma layer (Tgamma1+Tgamma) is 2 μm or less in the alloy layers formed by hot-dip galvanization, and the Gamma1 phase/Gamma phase thickness ratio (Tgamma1/Tgamma) is 1 or less. A tensile strength of 980 MPa or above can be easily imparted to the alloyed hot-dip galvanized steel sheet. The alloyed hot-dip galvanized steel sheet has excellent coating adherence, and coating separation during machining can be suppressed.

2 Claims, 1 Drawing Sheet

RELATIONSHIP AMONG (Γ1+Γ) THICKNESS, (Γ1+Γ) THICKNESS RATIO AND PLATING ADHESION

(51) Int. Cl.

| | | |
|---|---|---|
| *C23C 2/02* | (2006.01) | |
| *C23C 2/28* | (2006.01) | |
| *C21D 8/02* | (2006.01) | |
| *C23C 2/26* | (2006.01) | |
| *B32B 15/01* | (2006.01) | |
| *B21B 3/00* | (2006.01) | |
| *C23C 2/06* | (2006.01) | |
| *C21D 9/46* | (2006.01) | |
| *C22C 38/00* | (2006.01) | |
| *C22C 38/06* | (2006.01) | |
| *C22C 38/58* | (2006.01) | |
| *C22C 38/02* | (2006.01) | |
| *C22C 38/04* | (2006.01) | |
| *C21D 8/04* | (2006.01) | |
| *C21D 9/48* | (2006.01) | |

(52) U.S. Cl.
CPC .............. *B32B 15/18* (2013.01); *C21D 8/0426* (2013.01); *C21D 8/0436* (2013.01); *C21D 8/0463* (2013.01); *C21D 8/0478* (2013.01); *C21D 9/46* (2013.01); *C21D 9/48* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/58* (2013.01); *C23C 2/02* (2013.01); *C23C 2/06* (2013.01); *C23C 2/26* (2013.01); *C23C 2/28* (2013.01); *C21D 2211/001* (2013.01); *C21D 2211/002* (2013.01); *C21D 2211/005* (2013.01); *C21D 2211/008* (2013.01); *Y10T 428/12799* (2015.01); *Y10T 428/12958* (2015.01); *Y10T 428/12972* (2015.01); *Y10T 428/2495* (2015.01); *Y10T 428/24942* (2015.01); *Y10T 428/24967* (2015.01)

(56) References Cited

FOREIGN PATENT DOCUMENTS

| | | |
|---|---|---|
| JP | 64-068456 | 3/1999 |
| JP | 2002-030403 | 1/2002 |
| JP | 2002-173756 | 6/2002 |
| JP | 2004-027263 | 1/2004 |
| JP | 3 557 810 | 5/2004 |
| JP | 2005-133201 | 5/2005 |
| JP | 2007-182625 | 7/2007 |
| JP | 2007-211279 | 8/2007 |
| JP | 2007-231373 | 9/2007 |
| JP | 2008-127637 | 6/2008 |
| JP | 2011-094215 | 5/2011 |

OTHER PUBLICATIONS

Machine Translation, Hori et al. JP 2002-030403, Jan. 2002.*
International Search Report dated Dec. 25, 2012 issued in corresponding PCT Application No. PCT/JP2012/075198 [with English Translation].
Supplemental European Search Report for EP Application No. 12 83 6371, mailed on Jul. 30, 2015.

* cited by examiner

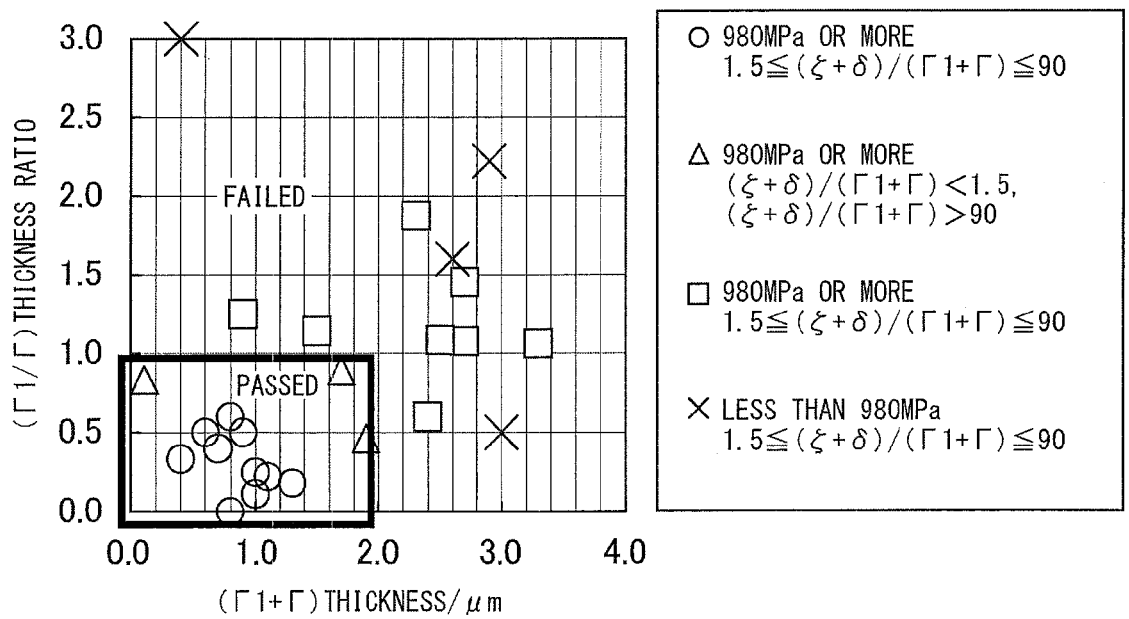
RELATIONSHIP AMONG ($\Gamma$1+$\Gamma$) THICKNESS, ($\Gamma$1+$\Gamma$) THICKNESS RATIO AND PLATING ADHESION

ALLOYED HOT-DIP GALVANIZED STEEL SHEET

This application is a national stage application of International Application No. PCT/JP2012/075918, filed Sep. 28, 2012, which claims priority to Japanese Application No. 2011-217145, filed Sep. 30, 2011, each of which is incorporated by reference in its entirety.

TECHNICAL FIELD

The present invention relates to an alloyed hot-dip galvanized steel sheet. More specifically, the present invention relates to a high-strength alloyed hot-dip galvanized steel sheet, which is capable of easily realizing a high strength (for example, a tensile strength of 980 MPa or more), is excellent in the coating adhesion, and is suitable as a member in automotive field, home appliance field, building material field, and the like.

BACKGROUND ART

Heretofore, alloyed hot-dip galvanized steel sheets have been used mainly in the automotive field. However, in the plating layer of the alloyed hot-dip galvanized steel sheet, a Zn—Fe alloy layer, which is inferior in the ductility to the underlying steel sheet, is present. In a case where a tensile strength of 980 MPa or more is required, this layer has been considered to be a problem, because the plating (or coating) adhesion thereof is poor and the plating is liable to be separated from the interface between the plating and the underlying steel sheet, at the time of working such as press molding, to thereby readily cause an appearance failure such as indentation mark.

Therefore, Patent Document 1 describes, as a measure for improving the plating adhesion, a method of enhancing the plating adhesion by a so-called anchor effect, that is, by increasing the unevenness at the interface between the coating and the underlying steel sheet. Also, Patent Document 2 discloses that when a steel sheet is heated, and then is pickled, and after the removal of the oxide layer on the surface, is subjected to plating, to thereby improve the adhesion.

Also, Patent Document 3 discloses a high-strength high-ductility hot-dip galvanized steel sheet containing, in terms of volume fraction, from 30 to 90% of a ferrite phase, 5% or more of bainite, 10% or less of martensite, and from 5 to 30% of a retained austenite phase. Patent Document 4 discloses a high-strength cold-rolled steel sheet, where the density of dislocations contained in the steel sheet is $8\times10^{11}$ (dislocations/mm$^2$) or less, and the static/dynamic ratio (=FS2/FS1) as a ratio between a quasi-static strength (FS1) at a strain rate of 0.0067 (s$^{-1}$), and a dynamic strength (FS2) at a strain rate of 1,000 (s$^{-1}$) is 1.05 or more. Patent Document 5 discloses an alloyed hot-dip steel sheet comprising a base iron, and a specific plating layer disposed at least on one surface thereof, wherein plating layer does not have an η phase or ζ phase in the plating layer surface, the plating layer has a composition of Fe: from 8 to 12% and Al: from 0.05 to 0.25%, with the balance being Zn, and the Γ phase at the interface with the base iron is 1.0/μm or less.

However, in the prior art, the difference in ductility between the plating layer and the underlying steel sheet, which may be fundamentally a main factor contributing to the plating adhesion, has not been solved, and therefore, the plating (or coating) separation cannot be prevented from occurring during severe working.

RELATED ART

Patent Document

[Patent Document 1] JP-A (Japanese Unexamined Patent Publication; KOKAI) No. 2011-94215
[Patent Document 2] JP-A No. 2002-173756
[Patent Document 3] JP-A No. 2005-133201
[Patent Document 4] JP-A No. 2002-30403
[Patent Document 5] JP-A No. 64-68456

SUMMARY OF THE INVENTION

Problem to be Solved by the Invention

An object of the present invention is to provide an alloyed hot-dip galvanized steel sheet with a high strength (for example, a tensile strength of 980 MPa or more), which can be prevented from plating separation during working.

Another object of the present invention is to provide a high-strength alloyed hot-dip galvanized steel sheet, which is excellent in the plating adhesion.

Means for Solving the Problem

As a result of earnest study, the present inventors have found that when the ductility of a steel sheet itself can be reduced by the structure control of the steel sheet and further, the ductility of the plating itself is increased by controlling the amounts of Γ1 phase and Γ phase in the plating phase, the plating separation can be suppressed.

As a result of further study based on the above discovery, the present inventors have also found that when the total thickness of Γ1 phase and Γ phase present in the alloyed hot-dip galvanized layer is set to 2 μm or less, and the thickness of Γ1 phase having the lowest ductility among Zn—Fe alloy phases is set to be smaller than that of the Γ phase, the plating adhesion can be further enhanced.

According to the knowledge and investigations of the present inventors, the mechanism for providing the above-described effect in the present invention may be presumed as follows.

That is, the present inventors have found that fundamentally, even when the ductility of plating layer is increased, the Γ1 phase (Fe$_5$Zn$_{21}$, Fe content: 18% or more and less than 24%) and the Γ phase (Fe$_3$Zn$_{10}$, Fe: 24% or more and 32% nor less), which may be inevitably produced at the interface between the plating layer and the underlying steel sheet in an alloyed hot-dip galvanized layer, can hardly have a higher ductility than the ductility of the underlying steel sheet, and the plating cannot follow the deformation of the underlying steel sheet during working, to thereby cause plating separation.

On the other hand, the present inventors have also found that when the ductility of a steel sheet itself is reduced by the structure control of the steel sheet, and the ductility of the plating itself is increased by controlling the amounts of Γ1 phase and Γ phase in the plating phase, the plating separation can be suppressed. In a case where the ductility of a steel sheet itself is reduced, it can be assumed that the workability of the steel sheet may be lowered as compared to that of a conventional steel sheet, and a crack may be early generated in the underlying steel sheet, to thereby cause fracture. However, in the present invention, plating is applied to a steel sheet while controlling the amounts of Γ1 phase and Γ phase therein, so that fracture of the steel sheet can be prevented at the same level as, or to a higher level than that of the conventional steel sheet.

The reason why such a phenomenon occurs may not be necessarily clear, but the present inventors may presume that although a crack may be early generated in the underlying steel sheet, because plating with excellent ductility is present on the steel sheet in the present invention, the stress concentration on the cracking part may be relieved.

That is, the present invention relates to a high-strength alloyed hot-dip galvanized steel sheet excellent in elongation and plating adhesion. The present invention may include, for example, the following embodiments.

[1] An alloyed hot-dip galvanized steel sheet, which is a steel sheet comprising, in mass %, C: from 0.10 to 0.4%,
Si: from 0.01 to 0.5%,
Mn: from 1.0 to 3.0%,
O: 0.006% or less,
P: 0.04% or less,
S: 0.01% or less,
Al: from 0.1 to 3.0%, and
N: 0.01% or less, with the balance being Fe and unavoidable impurities, wherein the structure of the steel sheet further comprises, in terms of volume fraction, 40% or more of the total content of bainite and martensite, from 8 to 60% of retained austenite, and less than 40% of ferrite, with the balance being an unavoidable structure, and alloying hot-dip galvanization is applied to the steel sheet surface, and wherein the total thickness of the thickness $T\gamma 1$ of $\Gamma 1$ layer and the thickness $T\gamma$ of $\Gamma$ layer in the alloyed hot-dip galvanized layer is 2 μm or less and the ratio ($T\gamma 1/T\gamma$) of thickness between $\Gamma 1$ phase and $\Gamma$ phase is 1 or less.

[2] The alloyed hot-dip galvanized steel sheet according to [1], wherein the ratio $\{(T\zeta+T\delta)/(T\gamma 1+T\gamma)\}$ of the total thickness of thickness $T\zeta$ of $\zeta$ layer and thickness $T\delta$ of $\delta$ layer in the alloyed hot-dip galvanized layer to the total thickness of $\Gamma 1$ layer and $\Gamma$ layer is from 1.5 to 90.

[3] The alloyed hot-dip galvanized steel sheet according to [1] or [2], wherein the steel sheet further comprises one member or two or more members of, in mass %, Cr: from 0.05 to 1.0%,
Ni: from 0.05 to 1.0%,
Cu: from 0.05 to 1.0%,
Nb: from 0.005 to 0.3%,
Ti: from 0.005 to 0.3%,
V: from 0.005 to 0.5%,
B: from 0.0001 to 0.01%,
Ca: from 0.0005 to 0.04%,
Mg: from 0.0005 to 0.04%,
La: from 0.0005 to 0.04%,
Ce: from 0.0005 to 0.04%, and
Y: from 0.0005 to 0.04%.

[4] A process for producing an alloyed hot-dip galvanized steel sheet, comprising:

heating a steel material comprising, in mass %,
C: from 0.10 to 0.4%,
Si: from 0.01 to 0.5%,
Mn: from 1.0 to 3.0%,
O: 0.006% or less,
P: 0.04% or less,
S: 0.01% or less,
Al: from 0.1 to 3.0%, and
N: 0.01% or less, with the balance being Fe and unavoidable impurities, at 1,100 to 1,300° C. and then subjecting the steel sheet to a hot rolling treatment at a finish rolling temperature of Ar3 temperature or more;

taking up the hot-rolled steel sheet at a take-up temperature of 700° C. or less and then cold-rolling the steel sheet;

annealing the cold-rolled steel sheet at a maximum heating temperature of 750 to 900° C.;

cooling the annealed steel sheet to a plating bath immersion temperature at a cooling rate of 3 to 200° C./sec in the range of 500 to 750° C. and then holding the steel sheet at 350 to 500° C. for 10 to 1,000 seconds;

performing a plating treatment by immersing the steel sheet in a hot-dip galvanizing bath having an Al concentration $W_{Al}$ and an Fe concentration $W_{Fe}$ satisfying, in mass %, the following relational expressions (1) and (2), at a steel sheet temperature ranging, on immersion in a plating bath, from a temperature 40° C. lower than the hot-dip galvanizing bath temperature to a temperature 50° C. higher than the hot-dip galvanizing bath temperature, in a nitrogen atmosphere having a nitrogen content of 95 mass % or more, in which the logarithm log ($P_{H2O}/P_{H2}$) value of the ratio between hydrogen partial pressure $P_{H2}$ and water vapor partial pressure $P_{H2O}$ is from −5 to −2:

$$0.01 \le W_{Fe} \le 0.05 \quad (1)$$

$$0.07 \le (W_{Al} - W_{Fe}) \le 0.30 \quad (2)$$

and thereafter, performing an alloying treatment, in which the time from the steel sheet leaving the plating bath to entering an alloying heating furnace is from 0.5 to 6 seconds and the alloying heating temperature of the plating layer is from 440 to 600° C.;

wherein Ar3=901−325×C+33×Si−92×(Mn+Ni/2+Cr/2+Cu/2+Mo/2), wherein C, Si, Mn, Ni, Cr, Cu and Mo indicate the contents (mass %) of respective components and take 0 when the component is not contained.

Effect of the Invention

The present invention can provide an alloyed hot-dip galvanized steel sheet having a high strength (for example, a tensile strength of 980 MPa or more) and being excellent in the plating adhesion. The production of the high-strength alloyed hot-dip galvanized steel sheet according to the present invention may be relatively easy and can be performed stably. Therefore, the high-strength alloyed hot-dip galvanized steel sheet may be optimally usable particularly as a steel sheet for automobiles in recent years, which is intended for attaining weight reduction. As a result, the industrial value thereof may be remarkably high.

BRIEF DESCRIPTION OF THE DRAWINGS

FIG. 1 is a graph showing a relationship of ($T\gamma 1+T\gamma$) thickness and ($T\gamma 1/T\gamma$) thickness ratio with plating adhesion. The symbols in FIG. 1 have the following meanings:

A: a tensile strength of 980 Mpa or more and $1.5\{(T\zeta+T\delta)/(T\gamma 1+T\gamma)\} \le 90$;

B: a tensile strength of 980 Mpa or more and $\{(T\zeta+T\delta)/(T\gamma 1+T\gamma)\} < 1.5$ or $\{(T\zeta+T\delta)/(T\gamma 1+T\gamma)\} > 90$;

C: a tensile strength of 980 Mpa or more and $1.5 \le \{(T\zeta+T\delta)/(T\gamma 1+T\gamma)\} \le 90$; and D: a tensile strength of less than 980 Mpa and $1.5 \le \{(T\zeta+T\delta)/(T\gamma 1+T\gamma)\} \le 90$.

MODE FOR CARRYING OUT THE INVENTION

Hereinbelow, the present invention is described in sequence.

First, the reasons for the limitation on the components are described. In this connection, "%" means mass %.

C:

C may be an element capable of increasing the strength of the steel sheet. However, if its content is less than 0.1%, it may be difficult to satisfy both of the tensile strength of 980 MPa or more, and the workability. On the other hand, if the content exceeds 0.40%, spot weldability can be hardly ensured. For this reason, the content is set to be from 0.1 to 0.40%. The C content may preferably be from 0.13 to 0.3, more preferably from 0.19 to 0.28.

Si:

Si may be an alloying (or strengthening) element and may be effective in increasing the strength of the steel sheet. Also, this element may suppress the precipitation of cementite and in turn, contribute to stabilization of retained austenite, and therefore, its addition may be indispensable. If its content is less than 0.01%, the effect of increasing the strength may be small. On the other hand, if the content exceeds 0.5%, the workability may be reduced. For this reason, the Si content is set to be from 0.01 to 0.5%. The Si content may preferably be from 0.2 to 0.45%, more preferably from 0.25 to 0.42%.

Mn:

Mn may be an alloying element and may be effective in increasing the strength of the steel sheet. However, if its content is less than 1.0%, the tensile strength of 980 MPa or more may be difficult to obtain. On the other hand, if the content is large, co-segregation with P or S may be promoted to involve significant deterioration of the workability and therefore, an upper limit of 3.0% is specified. For this reason, the Mn content is set to be from 1.0 to 3.0%. The Mn content may preferably be from 2.0 to 2.7%, more preferably from 2.1 to 2.45%.

O:

O may form an oxide and deteriorate the elongation, bendability or hole expandability and therefore, the amount added of this element must be kept low. Among others, an oxide may often exist as an inclusion and when the oxide is present in the punched edge face or cut surface, a notched flaw or a coarse dimple may be formed on the end face to invite stress concentration during hole expansion or severe working and serve as an origin of crack formation, giving rise to significant deterioration of the hole expandability or bendability. If the content of O exceeds 0.006%, the above-described tendency may be conspicuous, and therefore, the O content is specified to an upper limit of 0.006% or less. That is, O is limited as an impurity to 0.006% or less. The O content may preferably be 0.004% or less, more preferably 0.003% or less. On the other hand, an O content of less than 0.0001% may be economically disadvantageous because of involving an excessive rise in the cost, and therefore, this value may be substantially the lower limit.

P:

P may tend to be segregated at the center in the sheet thickness of the steel sheet and bring about embrittlement of a welded part. If its content exceeds 0.04%, significant embrittlement of the welded part may occur, and therefore, a proper content range of 0.04% or less is specified. That is, P is limited as an impurity to 0.04% or less. The P content may preferably be 0.03% or less, more preferably 0.025% or less. The lower limit of P content may not be particularly specified, but a content of less than 0.0001% may be economically disadvantageous, and therefore, this value may preferably be set as the lower limit.

S:

S may adversely affect the weldability and manufacturability during casting and hot rolling. For this reason, the upper limit of its content is set to 0.01% or less. That is, S is limited as an impurity to 0.01% or less. The S content may preferably be 0.008% or less, more preferably 0.006% or less. The lower limit of S content may not be particularly specified, but a content of less than 0.0001% may be economically disadvantageous, and therefore, this value may preferably be set as the lower limit. In addition, since S may be bound to Mn to form coarse MnS and deteriorate the bendability or hole expandability, the content of this element may preferably be set as low as possible.

Al:

Al may promote ferrite formation to enhance the ductility and therefore, may be added. This element may also be utilized as a deoxidizing agent. If its content is less than 0.1%, the effect of the element may be insufficient. On the other hand, its excessive addition may lead to an increase in the number of Al-based coarse inclusions and give rise to deterioration of hole expandability or cause a surface flaw. For this reason, the Al content is set to be from 0.1 to 3.0%. The Al content may preferably be from 0.2 to 1.5%, more preferably from 0.3 to 1.0%.

N:

N may form a coarse nitride to deteriorate the bendability or hole expandability and therefore, the amount added thereof must be kept low. If the N content exceeds 0.01%, the tendency above may be conspicuous, and therefore, the range of the N content is set to 0.01% or less. The N content may preferably be 0.008% or less, more preferably 0.006% or less. From the standpoint of reducing the formation of a blow hole during welding, the N content may be smaller. Although the effects according to the present invention can be achieved without particularly specifying the lower limit, an N content of less than 0.0005% may involve a great increase in the production cost, and therefore, this value may be substantially the lower limit.

Cr:

Cr may be an alloying element and at the same time, may be important in enhancing the quenchability. However, if its content is less than 0.05%, these effects may not be obtained, and therefore, a lower limit of 0.05% is specified. On the contrary, containing this element in excess of 1.0% may adversely affect the manufacturability during production and hot rolling, and therefore, an upper limit of 1.0% is specified. The Cr content may preferably be 0.5% or less, more preferably 0.45% or less.

Ni:

Ni may be an alloying element and at the same time, may be important in enhancing the quenchability. However, if its content is less than 0.05%, these effects may not be obtained, and therefore, a lower limit of 0.05% is specified. On the contrary, containing this element in excess of 1.0% may adversely affect the manufacturability during production and hot rolling, and therefore, an upper limit of 1.0% is specified. In addition, this element may enhance the wettability of molten metal or promote an alloying reaction and therefore, may be added. The Ni content may preferably be 0.6% or less, more preferably 0.52% or less.

Cu:

Cu may be an alloying element and at the same time, may be important in enhancing the quenchability. However, if its content is less than 0.05%, these effects may not be obtained, and therefore, a lower limit of 0.05% is specified. On the contrary, containing this element in excess of 1.0% may adversely affect the manufacturability during production and hot rolling, and therefore, an upper limit of 1.0% is specified. In addition, this element may enhance the wettability of molten metal or promote an alloying reaction and therefore, may be added. The Cu content may preferably be 0.5% or less, more preferably 0.35% or less.

Nb:

Nb may be an alloying element and may contribute to increase in the strength of the steel sheet by precipitation strengthening, fine grain strengthening through suppressing growth of a ferrite crystal grain, and dislocation strengthening through suppressing recrystallization. If the amount added thereof is less than 0.005%, these effects may not be obtained, and therefore, a lower limit of 0.005% is specified. If this element is contained in excess of 0.3%, the amount of carbonitride precipitated may be increased to deteriorate the formability, and therefore, an upper limit of 0.3% is specified. The Nb content may preferably be from 0.005 to 0.25%, more preferably from 0.005 to 0.20%.

Ti:

Ti may be an alloying element and may contribute to increase in the strength of the steel sheet by precipitation strengthening, fine grain strengthening through suppressing growth of a ferrite crystal grain, and dislocation strengthening through suppressing recrystallization. If the amount added thereof is less than 0.005%, these effects may not be obtained, and therefore, a lower limit of 0.005% is specified. If this element is contained in excess of 0.3%, the amount of carbonitride precipitated may be increased to deteriorate the formability, and therefore, an upper limit of 0.3% is specified. The Ti content may preferably be from 0.005 to 0.25%, more preferably from 0.005 to 0.20%.

V:

V may be an alloying element and may contribute to increase in the strength of the steel sheet by precipitation strengthening, fine grain strengthening through suppressing growth of a ferrite crystal grain, and dislocation strengthening through suppressing recrystallization. If the amount added thereof is less than 0.005%, these effects may not be obtained, and therefore, a lower limit of 0.005% is specified. If this element is contained in excess of 0.5%, the amount of carbonitride precipitated may be increased to deteriorate the formability, and therefore, an upper limit of 0.5% is specified. The V content may preferably be from 0.005 to 0.4%, more preferably from 0.005 to 0.3%.

Addition of B in an amount of 0.0001% or more may be effective in strengthening a grain boundary or increasing the strength of the steel material, but if the amount added exceeds 0.01%, not only the effect may be saturated but also the manufacturability during hot rolling may be reduced, and therefore, an upper limit of 0.01% is specified.

One member or two or more members selected from Ca, Mg and REM may be added in a total amount of 0.0005 to 0.04%. Ca, Mg and REM may be an element used for deoxidization, and it may be preferred to contain one member or two or more members thereof in a total amount of 0.0005% or more. Here, REM is Rare Earth Metal. However, if the total content of Ca, Mg and REM exceeds 0.04%, degradation of forming workability may be caused. For this reason, the total content thereof is set to be from 0.0005 to 0.04%.

Incidentally, in the present invention, REM may be added in the form of misch metal in many cases, and there may be a case in which a combination of elements in the lanthanoid series is contained in addition to La and Ce. Even when such elements in the lanthanoid series other than La and Ce are contained as unavoidable impurities, the effects according to the present invention may be brought out. In this connection, the effects according to the present invention may also be brought out even when metallic La and Ce are added.

The structure of the steel material may be described below.

In the steel sheet according to the present invention, the total content of bainite and martensite is 40% or more in terms of volume fraction. The lower limit of their total content percentage is set to 40%, because bainite and martensite may be necessary to ensure elongation and strength.

The steel sheet according to the present invention needs to contain, in terms of volume fraction, from 8 to 60% of retained austenite. By containing retained austenite, increase in the strength and further improvement of ductility may be achieved at the same time. If the volume fraction is less than 8%, the effect above can be hardly obtained, and therefore, a lower limit of 8% or more is specified. An upper limit of 60% or less is specified, because if its volume fraction exceeds 60%, the volume fraction of bainite or martensite may be less than 40%, and sufficient elongation and strength may not be secured. The content of retained austenite ($\gamma$) may preferably be from 9 to 40%, more preferably from 10 to 35%.

The ferrite content must be less than 40%. Ferrite may enhance the ductility, but if the content is 40% or more, the strength cannot be secured. As the form of ferrite, acicular ferrite may be incorporated other than polygonal ferrite.

Also, the unavoidable structure of the balance as used in the present invention indicates a pearlite structure.

With respect to the above-described microstructure phases, ferrite, martensite, bainite, austenite, pearlite and the balance structure, the identification, observation of existing position, and measurement of area ratio can be performed by using a nital reagent and a reagent disclosed in JP-A No. 59-219473 to etch the steel sheet in the rolling direction cross-section or the cross-section in the direction perpendicular to the rolling direction and effecting a quantitative determination by observation through an optical microscope at 1,000 times and scanning and transmission electron microscopes at 1,000 to 100,000 times. After observation of 20 or more visual fields for each, the area ratio of each structure can be determined by a point counting method or image analysis.

The constitution of the alloyed hot-dip galvanized layer may be described below.

The total of the thickness $T\gamma 1$ of $\Gamma 1$ phase and the thickness $T\gamma$ of $\Gamma$ phase in the alloyed hot-dip galvanized layer according to the present invention must be 2 μm or less as shown in FIG. 1. Both the $\Gamma 1$ phase and the $\Gamma$ phase may be unavoidably produced during alloying hot-dip galvanization, and if the total thickness thereof exceeds 2 μm, the ductility may be insufficient and the plating adhesion may be deteriorated. The total thickness of $\Gamma 1$ phase and $\Gamma$ phase may preferably be $T\gamma 1+T\gamma$=from 0.1 to 1.9 μm, more preferably from 0.1 to 1.5 μm. Thinner $\Gamma 1$ phase and $\Gamma$ phase may be more preferred, but production while sufficiently suppressing the occurrence of $\Gamma 1$ phase and $\Gamma$ may be difficult, and therefore, in view of practical production, the lower limit of $T\gamma 1+T\gamma$ may preferably be 0.1 μm.

The ratio ($T\gamma 1/T\gamma$) of thickness between $\Gamma 1$ phase and $\Gamma$ phase must be 1 or less as shown in FIG. 1. If the ratio exceeds 1, the effect of the $\Gamma 1$ phase extremely poor in ductility may be great, and plating separation cannot be prevented. The ratio ($T\gamma 1/T\gamma$) may preferably be 0.9 or less, more preferably 0.8 or less. The ratio ($T\gamma 1/T\gamma$) of thickness between $\Gamma 1$ phase and $\Gamma$ phase may preferably be smaller for enhancing the plating adhesion, but in the production, it may be difficult to sufficiently suppress occurrence of $\Gamma 1$ phase and at the same time, increase the thickness of $\Gamma$ phase, and therefore, in view of practical production, the lower limit may preferably be 0.005.

The ratio of the total thickness of thickness $T\zeta$ of $\zeta$ layer ($FeZn_{13}$) and thickness $T\delta$ of $\delta$ layer ($FeZn_7$) in the alloyed hot-dip galvanized layer to the total thickness ($T\gamma 1+T\gamma$) of $\Gamma 1$ layer and Γ layer, that is, {(Tζ+Tδ)/(Tγ1+Tγ)}, may preferably be from 1.5 to 90 as shown in FIG. 1. If the ratio is less than 1.5, the effect of Γ1 phase and Γ each lacking in ductility may be great, and the plating adhesion may be slightly poor. If the ratio exceeds 90, the effect may be saturated, and the control therefor may largely restrict the production, and therefore, the ratio may preferably be 90 or less. The ratio {(Tζ+Tδ)/(Tγ1+Tγ)} may preferably be from 2 to 80, more preferably from 3 to 75.

The method of measuring the thickness of each alloy layer in the alloyed hot-dip galvanized layer may include various methods and include, for example, "Microscopic Cross-Sectional Test Method" (JIS H 8501). This may be a method where the cross-section of the sample is embedded, polished and then, if desired, etched with an etchant and the polished surface is analyzed by an optical microscope, a scanning electron microscope (SEM), an electron beam microanalyzer (EPMA) or the like to determine the thickness.

In the present invention, the sample was embedded in Technovit 4002 (produced by Maruto Instrument Co., Ltd.), polished with polishing papers (JIS R 6001) #240, #320, #400, #600, #800 and #1000 in this order, then etched by dipping the polished surface in a nital solution (a 0.5% ethanol nitrate solution) for 10 seconds, and observed by SEM to determine the thickness of each alloy phase.

In this connection, the thickness of each alloy phase as used herein may mean a value obtained by determining the thickness of each alloy phase in the plating layer at arbitrary 10 portions spaced apart from one another by 1 mm or more and averaging the determined thicknesses of the alloy phase.

Also, ζ phase ($FeZn_{13}$), $δ_1$ phase ($FeZn_7$), $Γ_1$ phase ($Fe_5Zn_{21}$) and Γ phase ($Fe_3Zn_{10}$) which are an alloy phase may differ from each other in the composition and constitution, and therefore, the kind of each alloy phase can be identified by the analysis using EPMA, an X-ray diffraction method (XRD), a transmission electron microscope (TEM) or the like.

In the present invention, the kind of each alloy phase was identified by TEM analysis (the same analysis as those described, for example, in Hong, M. N., and Saka, H., *Proc. 4th Intern. Conf. On Zn and Zn Alloy Coated Steel Sheet, Galvatech '98*, p. 248, 1998; and Kato, T., Hong, M. H., Nunome, K., Sasaki, K., Kuroda, K., and Saka, H., *Thin Solid Films*, 319, 132, 1998). For details of the analysis method by TEM, these publications can be referred to, if desired.

In the method of measuring the thickness of each layer in the alloyed hot-dip galvanized phase, the thickness of each layer may also be measured using the "cross-sectional structure observation method". Here, the "cross-sectional structure observation method" may be a method where after the sample is embedded, polished and then etched with an etchant, for example, 0.5% hydrochloric acid having added thereto nital or an inhibitor, the thickness is determined from the structure observed by an optical microscope or a scanning electron microscope. The thickness of each structure may be an average of thicknesses at arbitrary 10 portions in the observation range of 10 mm in length. In addition, with respect to these structures observed, the composition or constitution may be examined by EPMA, X-ray diffraction, transmission electron microscope or the like to identify the kind of the alloy phase. In this cross-sectional structure observation, the structure may preferably be examined by EPMA.

The production process for the high-strength alloyed hot-dip galvanized steel sheet with excellent plating adhesion according to the present invention may be described below.

The production process preceding hot rolling may not be particularly limited. Namely, various kinds of secondary refining may be performed subsequently to smelting in a blast furnace, an electric furnace or the like, and thereafter, casting may be performed by normal continuous casting, casting by an ingot method, thin slab casting or other methods. In the case of continuous casting, the steel may be once cooled to a low temperature, again heated and then hot-rolled, or the cast slab may be continuously hot-rolled. Scrap may be used for the raw material.

The effects according to the present invention can be brought out without particularly specifying the hot-rolled slab heating temperature. However, an excessively high heating temperature may not be preferred from an economical point of view, and therefore, the upper limit of the heating temperature may preferably be less than 1,300° C. Also, if the heating temperature is excessively low, the finish rolling temperature can be hardly controlled to Ar3 temperature or more, and therefore, the lower-limit temperature may preferably be 1,100° C.

If the finish rolling temperature enters the two-phase region of austenite+ferrite, the structural non-uniformity in the steel sheet may be increased to deteriorate the formability after annealing. For this reason, the finish rolling temperature may preferably be Ar3 temperature or more. Incidentally, the Ar3 temperature may be calculated according to the following formula:

$$Ar3=901-325×C+33×Si-92×(Mn+Ni/2+Cr/2+Cu/2+Mo/2)$$

Cooling after rolling may not be particularly specified, and the effects according to the present invention can be obtained even when a cooling pattern for performing structure control matching respective purposes is employed.

The take-up temperature must be 700° C. or less. If the take-up temperature exceeds 700° C., not only a coarse ferrite or pearlite structure may be allowed to exist in the hot-rolled structure, giving rise to a failure in keeping retained austenite to fall in the range according to the present invention and in turn, obtaining an underlying steel sheet in the scope according to the present invention, but also the structure non-uniformity after annealing may tend to become large, leading to an increase in material anisotropy of the final product. In the present invention, it may be preferred to enhance the strength-ductility balance by making the structure after annealing fine. Also, a take-up temperature exceeding 700° C. may not be preferred, because the thickness of an oxide formed on the steel sheet surface may be excessively increased and in turn, the pickling effect may be poor. Although the effects according to the present invention can be brought out without particularly specifying the lower limit, taking up at a temperature not more than room temperature may be technically difficult and therefore, this temperature may be substantially the lower limit. Incidentally, at the hot rolling, finish rolling may be continuously performed by splicing crude rolled sheets together. Also, the crude rolled sheet may be once taken up.

The steel sheet after hot rolling may be usually subjected to removal of scale on the surface by a pickling treatment. Pickling may be performed once, or pickling may be performed in a plurality of parts.

The hot-rolled steel sheet after pickling may be usually cold-rolled. The rolling reduction ratio may preferably be from 40 to 80%. If the rolling reduction ratio is less than 40%, the shape can be hardly kept flat or the ductility of the final product may become bad. On the other hand, in the case of cold rolling at a reduction ratio in excess of 80%, the cold-rolling load may be excessively large, and the cold rolling may become difficult. The effects according to the present invention can be brought out without particularly specifying the number of rolling passes and the rolling reduction ratio of each pass.

The cold-rolled steel sheet may be usually subjected to annealing and plating in a continuous annealing and plating line. Although the effects according to the present invention can be brought out without particularly specifying the heating rate during passing through the line, a heating rate of less than 0.5° C./sec may not be preferred, because the productivity may be greatly impaired. On the other hand, a heating rate exceeding 100° C. may involve excessive capital investment and may not be economically preferred.

The maximum heating temperature (annealing temperature) must be from 750 to 900° C. If the maximum heating temperature is less than 750° C., it may take too much time for the carbide formed during hot rolling to again enter a solid solution state, and a carbide or a part thereof may remain, as a result, a strength of 980 MPa or more can be hardly secured, failing in obtaining an underlying steel sheet within the scope according to the present invention. For this reason, the lower limit of the maximum heating temperature may be 750° C. On the other hand, excessively high-temperature heating may not only involve a rise in the cost and be disadvantageous from an economical point of view but also may induce a trouble such as deterioration of a sheet shape during passing of the sheet through the line at a high temperature or decrease in life of the roll. For this reason, the upper limit of the maximum heating temperature may be 900° C.

The heat treatment time in this temperature region may not be particularly limited, but for achieving dissolution of carbide, a heat treatment for 10 seconds or more may be preferred. On the other hand, if the heat treatment time exceeds 600 seconds, a rise in the cost may be involved, and therefore, such a heat treatment time may be not preferred from an economical point of view. Also in the heat treatment, isothermal holding may be performed at the maximum heating temperature, and even when gradient heating is performed and after reaching the maximum heating temperature, cooling is immediately started, the effects according to the present invention may be brought out.

After the completion of annealing, the steel sheet may be usually cooled to the plating bath immersion temperature. The average cooling rate from the maximum heating temperature to 750° C. may preferably be from 0.1 to 200° C./sec. A cooling rate of less than 0.1° C./sec may be not preferred, because the productivity may be greatly impaired. An excessive increase in the cooling rate may involve a rise in the production cost, and therefore, the upper limit may preferably be 200° C./sec.

The cooling rate in the range of 500 to 750° C. must be from 3 to 200° C./sec. If the cooling rate is too low, austenite may transform to a pearlite structure in the cooling process, and the austenite volume fraction of 8% or more can be hardly secured. For this reason, the lower limit may be 3° C./sec or more. Even if the cooling rate is increased, there may be no problem in terms of steel quality, but an excessive increase in the cooling rate may involve a rise in the production cost, and therefore, the upper limit may preferably be 200° C./sec. The cooling method may be any method of roll cooling, air cooling, water cooling, and a combination thereof.

Thereafter, the steel sheet may be held at a temperature of 350 to 500° C. for 10 to 1,000 seconds to cause bainite transformation and stabilize the retained austenite. The upper limit of the holding temperature may be set to 500° C., because bainite transformation may occur at not more than that temperature. Incidentally, if the steel sheet is held at a temperature of less than 350° C., the bainite transformation may spend a long time and in turn, excessively large equipment may be required, giving rise to poor productivity. For this reason, the holding temperature must be from 350 to 500° C. The lower limit may be set to 10 seconds, because holding for less than 10 seconds may not allow bainite transformation to proceed sufficiently, making it impossible to stabilize the retained austenite and obtain excellent formability. On the other hand, holding for more than 1,000 seconds may cause reduction in the productivity and may be not preferred. Incidentally, holding may not indicate only isothermal holding but may encompass gradual cooling or heating in this temperature region.

The sheet temperature on immersion in the plating bath may preferably be from a temperature 40° C. lower than the hot-dip galvanizing bath temperature to a temperature 50° C. higher than the hot-dip galvanizing bath temperature. If the bath-immersion sheet temperature is less than (hot-dip galvanizing bath temperature−40)° C., not only the heat extraction at immersion and entry in the plating bath may be large, causing partial solidification of the molten zinc to deteriorate the plating appearance, but also brittle Γ1 phase is liable to be produced at the interface between the underlying steel sheet and the plating. For this reason, the lower limit is set to (hot-dip galvanizing bath temperature−40)° C. However, even when the sheet temperature before immersion is below (hot-dip galvanizing bath temperature−40)° C., the steel sheet may be reheated before immersion in the plating bath to a sheet temperature of (hot-dip galvanizing bath temperature−40)° C. or more and then be immersed in the galvanizing bath. On the other hand, if the plating bath immersion temperature exceeds (hot-dip galvanizing bath temperature+50)° C., not only a thick Fe—Al alloy layer may be produced at the interface between the plating and the underlying steel sheet to impose a load on the alloying heating, but also Γ1 phase and Γ phase may be readily produced, failing in obtaining a plating having the hardness in the scope according to the present invention. Incidentally, the plating bath may contain Fe, Al, Mg, Mn, Si, Cr and the like, in addition to pure zinc.

The atmosphere at the time of immersing the steel sheet in the plating bath is a nitrogen atmosphere having a nitrogen content of 95 vol. % or more, in which the logarithm log $(P_{H2O}/P_{H2})$ value of hydrogen partial pressure $P_{H2}$ to water vapor partial pressure $P_{H2O}$ is from −5 to −2. If the log$(P_{H2O}/P_{H2})$ value is less than −5, this may not preferred from the economical view of point and in addition, the reactivity on the steel sheet surface or plating bath surface may be increased to allow thick formation of Γ and Γ1 in the subsequent alloying treatment process, failing in obtaining a plating within the scope according to the present invention. On the other hand, if the log$(P_{H2}/P_{H2})$ value exceeds −2, a Zn oxide may be formed on the plating bath surface and inhibit formation of Γ and Γ1 of the plating layer, as a result, not only a plating within the scope according to the present invention may not be obtained but also the plating may not adhere to the steel sheet, giving rise to unplating. If the nitrogen content is less than 95 vol. %, the proportion of water vapor and hydrogen in the atmosphere may be increased, which may not be preferred in view of profitability and safety. An increase in the proportion of hydrogen in the atmosphere may cause embrittlement of the steel sheet and reduction in the ductility and not be preferred. The atmosphere at the time of immersing the steel sheet in the plating bath as used herein may mean an atmosphere in the furnace at least 10 seconds or more before immersion in the plating bath, based on the time at which the steel sheet is immersed in the plating bath, and may mean the whole atmosphere in the time period maximally from annealing to immersion in the plating bath in a continuous annealing and plating line.

In order to control the properties of the plating layer, the hot-dip galvanizing bath is a plating bath having an Al concentration $W_{Al}$ and a Fe concentration $W_{Fe}$ satisfying, in mass %, the following relational expressions (1) and (2):

$$0.01 \le W_{Fe} \le 0.05 \quad (1)$$

$$0.07 \le (W_{Al} - W_{Fe}) \le 0.30 \quad (2)$$

If $W_{Fe}$ is less than 0.01, Γ1 phase and Γ phase may be formed thick at the interface between the plating layer and the steel sheet, and plating within the scope according to the present invention may not be obtained. If $W_{Fe}$ exceeds 0.05, Γ1 phase and Γ phase may not be produced sufficiently at the interface between the plating layer and the steel sheet, failing in obtaining plating within the scope according to the present invention, and in addition, top dross of $Fe_2Al_5$ may be formed in the plating bath to reduce the appearance.

The reason why $(W_{Al} - W_{Fe})$ is set to be from 0.07 to 0.30 is because if $(W_{Al} - W_{Fe})$ is less than 0.07, Γ1 phase and Γ phase may be formed thick at the interface between the plating layer and the steel sheet and not only a load may be imposed on the subsequent alloying heating but also a plating within the scope according to the present invention may not be obtained. On the other hand, if $(W_{Al} - W_{Fe})$ exceeds 0.30, alloying may proceed slowly and not only the productivity may be poor but also when heated until the whole plating is alloyed, Γ1 phase and Γ phase may be formed thick at the interface between the plating layer and the steel sheet, failing in obtaining a plating having a hardness within the scope according to the present invention.

The alloying heating temperature of the plating layer is from 440 to 600° C. If the alloying heating temperature is less than 440° C., alloying may proceed slowly and not only the productivity may be bad but also brittle Γ1 phase may be preferentially produced, failing in obtaining a plating within the scope according to the present invention. If the alloying heating temperature exceeds 600° C., not only a carbide may be formed to reduce the austenite volume fraction, making it difficult to secure a tensile maximum strength of 980 MPa or more and excellent ductility, but also Γ1 phase and Γ phase may be produced to more than 2 μm, failing in obtaining a plating within the scope according to the present invention. The alloying heating temperature may preferably be from 480 to 580° C., more preferably from 520 to 560° C.

The time from the steel sheet leaving the plating bath to entering an alloying heating furnace is set to be from 0.5 to 6 seconds. If this time exceeds 6 seconds, not only a thick Fe—Al alloy layer may be produced at the interface between the plating and the underlying steel sheet to impose a load on the subsequent alloying heating but also brittle Γ1 phase may be readily produced and moreover, the amounts of phase ζ and δ phase produced may be small, as a result, a plating having good adhesion within the scope according to the present invention may not be obtained. For suppressing production of brittle Γ1 phase, the time from the steel sheet leaving the plating bath to entering an alloying heating furnace may preferably be shorter, but a time of less than 0.5 seconds may impose a great lead on the production, and therefore, the lower limit is set to 0.5 seconds. As the preferred range, the upper limit may be 5 seconds or less, more preferably 4 seconds of less.

The material of the high-strength alloyed hot-dip galvanized steel sheet excellent in plating adhesion according to the present invention may be, in principle, produced through normal iron making steps of refining, steelmaking, casting, hot rolling and cold rolling, but the effects according to the present invention can be obtained even with a material produced by partially or entirely omitting these steps, as long as the conditions according to the present invention may be satisfied.

EXAMPLES

Hereinbelow, the present invention is described in more detail.

A slab having the components shown in Table 1 was heated at 1,200° C., water-cooled in a water-cooling zone, and then taken-up at the temperature shown in Table 2. The thickness of the hot-rolled sheet was set to fall in the range of 2 to 4.5 mm.

The hot-rolled sheet was pickled and then cold-rolled to have a sheet thickness of 1.2 mm after cold rolling, whereby a cold-rolled sheet was obtained.

Thereafter, the cold-rolled sheet was subjected to a heat treatment and a hot-dip galvanization treatment under the conditions shown in Table 2 in a continuous alloying hot-dip galvanization line, and the steel sheet was cooled at the cooling rate shown in Table 2 from the annealing temperature to a temperature of 500 to 750° C., then held at a temperature of 350 to 500° C. fro 5 to 300 seconds, immersed in a galvanizing bath controlled to predetermined conditions, thereby effecting an alloying treatment under respective conditions, and subsequently cooled to room temperature. At this time, the plating weight was set to about 45 g/m² on both surfaces. Finally, the obtained steel sheet was skin-pass rolled at a rolling reduction ratio of 0.4%.

TABLE 1

Chemical Components (mass %)

| | C | Si | Mn | O | P | S | Al | N | Cr | Ni | Cu | Nb | Ti | V | B | Ca | Mg | Rem | Remarks |
|---|---|---|---|---|---|---|---|---|---|---|---|---|---|---|---|---|---|---|---|
| A | 0.198 | 0.25 | 2.24 | 0.001 | 0.009 | 0.0032 | 0.51 | 0.0028 | 0.00 | 0.00 | 0.00 | 0.00 | 0.00 | 0.00 | 0.00 | 0.00 | 0.00 | 0.00 | Steel of Invention |
| B | 0.139 | 0.42 | 2.42 | 0.001 | 0.011 | 0.0029 | 0.58 | 0.0021 | 0.45 | 0.00 | 0.00 | 0.00 | 0.00 | 0.00 | 0.00 | 0.00 | 0.00 | 0.00 | Steel of Invention |
| C | 0.231 | 0.24 | 2.32 | 0.001 | 0.008 | 0.0024 | 0.59 | 0.0019 | 0.00 | 0.52 | 0.00 | 0.00 | 0.00 | 0.00 | 0.00 | 0.00 | 0.00 | 0.00 | Steel of Invention |
| D | 0.220 | 0.31 | 2.03 | 0.001 | 0.008 | 0.0022 | 0.69 | 0.0027 | 0.00 | 0.00 | 0.35 | 0.00 | 0.00 | 0.00 | 0.00 | 0.00 | 0.00 | 0.00 | Steel of Invention |
| E | 0.245 | 0.22 | 2.34 | 0.001 | 0.014 | 0.0019 | 0.58 | 0.0026 | 0.00 | 0.00 | 0.00 | 0.15 | 0.00 | 0.00 | 0.00 | 0.00 | 0.00 | 0.00 | Steel of Invention |
| F | 0.272 | 0.21 | 2.04 | 0.001 | 0.010 | 0.0042 | 0.78 | 0.0021 | 0.00 | 0.00 | 0.00 | 0.00 | 0.15 | 0.00 | 0.00 | 0.00 | 0.00 | 0.00 | Steel of Invention |
| G | 0.263 | 0.28 | 2.19 | 0.001 | 0.009 | 0.0039 | 0.75 | 0.0020 | 0.15 | 0.00 | 0.00 | 0.00 | 0.00 | 0.25 | 0.00 | 0.00 | 0.00 | 0.00 | Steel of Invention |
| H | 0.219 | 0.28 | 2.26 | 0.001 | 0.006 | 0.0035 | 0.76 | 0.0016 | 0.00 | 0.00 | 0.00 | 0.00 | 0.00 | 0.00 | 0.00 | 0.00 | 0.00 | 0.00 | Steel of Invention |

TABLE 1-continued

| | Chemical Components (mass %) | | | | | | | | | | | | | | | | | | |
|---|---|---|---|---|---|---|---|---|---|---|---|---|---|---|---|---|---|---|---|
| | C | Si | Mn | O | P | S | Al | N | Cr | Ni | Cu | Nb | Ti | V | B | Ca | Mg | Rem | Remarks |
| I | 0.195 | 0.27 | 2.30 | 0.001 | 0.010 | 0.0036 | 0.78 | 0.0013 | 0.00 | 0.00 | 0.00 | 0.03 | 0.00 | 0.00 | 0.00 | 0.01 | 0.00 | 0.00 | Steel of Invention |
| J | 0.199 | 0.26 | 2.31 | 0.001 | 0.014 | 0.0019 | 0.74 | 0.0033 | 0.00 | 0.00 | 0.00 | 0.00 | 0.04 | 0.00 | 0.00 | 0.00 | 0.01 | 0.00 | Steel of Invention |
| K | 0.249 | 0.26 | 2.29 | 0.001 | 0.019 | 0.0008 | 0.76 | 0.0045 | 0.00 | 0.00 | 0.00 | 0.00 | 0.00 | 0.00 | 0.00 | 0.00 | 0.00 | 0.01 | Steel of Invention |
| a | 0.623 | 0.31 | 2.56 | 0.001 | 0.012 | 0.0008 | 0.78 | 0.0022 | 0.00 | 0.00 | 0.00 | 0.00 | 0.00 | 0.00 | 0.00 | 0.00 | 0.00 | 0.00 | Comparative Steel |
| b | 0.071 | 0.25 | 1.95 | 0.001 | 0.009 | 0.0033 | 0.82 | 0.0025 | 0.00 | 0.00 | 0.00 | 0.00 | 0.00 | 0.00 | 0.00 | 0.00 | 0.00 | 0.00 | Comparative Steel |
| c | 0.185 | 0.80 | 1.76 | 0.001 | 0.019 | 0.0026 | 0.75 | 0.0011 | 0.00 | 0.00 | 0.00 | 0.00 | 0.00 | 0.00 | 0.00 | 0.00 | 0.00 | 0.00 | Comparative Steel |
| d | 0.176 | 0.25 | 0.80 | 0.001 | 0.008 | 0.0016 | 0.69 | 0.0009 | 0.00 | 0.00 | 0.00 | 0.00 | 0.00 | 0.00 | 0.00 | 0.00 | 0.00 | 0.00 | Comparative Steel |
| e | 0.215 | 0.23 | 2.32 | 0.010 | 0.020 | 0.0015 | 0.70 | 0.0021 | 0.20 | 0.00 | 0.00 | 0.00 | 0.00 | 0.00 | 0.00 | 0.00 | 0.00 | 0.00 | Comparative Steel |
| f | 0.222 | 0.23 | 2.20 | 0.001 | 0.080 | 0.0015 | 0.70 | 0.0021 | 0.00 | 0.30 | 0.00 | 0.00 | 0.00 | 0.11 | 0.00 | 0.00 | 0.00 | 0.00 | Comparative Steel |
| g | 0.212 | 0.24 | 2.26 | 0.001 | 0.012 | 0.0200 | 0.70 | 0.0020 | 0.00 | 0.00 | 0.20 | 0.00 | 0.00 | 0.00 | 0.001 | 0.00 | 0.00 | 0.00 | Comparative Steel |
| h | 0.225 | 0.25 | 2.25 | 0.001 | 0.012 | 0.0021 | 4.20 | 0.0021 | 0.00 | 0.00 | 0.00 | 0.10 | 0.00 | 0.00 | 0.001 | 0.005 | 0.00 | 0.00 | Comparative Steel |
| l | 0.225 | 0.25 | 2.25 | 0.001 | 0.012 | 0.0021 | 0.02 | 0.0021 | 0.00 | 0.00 | 0.00 | 0.00 | 0.10 | 0.00 | 0.00 | 0.00 | 0.005 | 0.005 | Comparative Steel |

The underline indicates that the value is outside the scope according to the present invention.

In the tensile test, a JIS No. 5 test piece was sampled in the directions perpendicular and parallel to the rolling direction of the 1.2 mm-thick sheet and evaluated for tensile properties. From the obtained elongation value, the difference (ΔE1) between elongation (L–E1) when a tensile test was performed in the direction parallel to the rolling direction, and elongation (C–E1) when the tensile test was performed in the direction perpendicular to the rolling direction, was calculated. In each sample, the tensile test was performed on 5 sheets and by determining the average of the values, the tensile strength (TS) was calculated from the average value. Incidentally, with respect to the steel sheet having a large material anisotropy, the elongation value tended to vary.

As for the plating adhesion, a steel sheet cut into 40×100 mm at an arbitrary position in an arbitrary direction was bent at 90° (bending radius R=1 mm or 3 mm) and returned flat, a tape was attached to the bent part and immediately peeled off, the separation width of plating attached to the tape was measured, and good or bad of plating adhesion was evaluated according to the following criteria. "A" and "B" were judged as passed.

A: No plating separation.
B: Slight plating separation (separation width: from more than 0 mm to 5 mm).
C: Significant plating separation (separation width: more than 5 mm).

The tensile properties measured and the plating conditions are shown in Table 2. It may be seen that all of steel sheets according to the present invention are excellent in plating adhesion.

TABLE 2

| Steel Species | Hot Rolling Take-Up Temperature/° C. | Cold Rolling Cold Rolling Reduction Ratio/% | Annealing | | | | | Remarks |
|---|---|---|---|---|---|---|---|---|
| | | | Annealing Temperature/° C. | Holding Time of Annealing/s | Cooling Rate from Maximum Heating Temperature to 750° C./° C./s | Cooling Rate at 500 to 750° C./° C./s | Holding Time at 350 to 500° C./s | |
| A | 620 | 60 | 820 | 90 | 100 | 5 | 30 | Steel of Invention |
| A | 780 | 60 | 820 | 90 | 100 | 5 | 30 | Comparative Steel |
| A | 620 | 60 | 720 | 90 | 100 | 5 | 30 | Comparative Steel |
| A | 650 | 60 | 820 | 90 | 100 | 1 | 30 | Comparative Steel |
| A | 662 | 60 | 800 | 90 | 100 | 5 | 6 | Comparative Steel |
| A | 658 | 60 | 800 | 90 | 100 | 5 | 30 | Comparative Steel |
| A | 668 | 60 | 800 | 90 | 100 | 5 | 30 | Comparative Steel |
| A | 560 | 60 | 800 | 90 | 100 | 5 | 30 | Comparative Steel |
| A | 565 | 60 | 800 | 90 | 100 | 5 | 30 | Comparative Steel |

TABLE 2-continued

| Steel Species | | | | | | | | Remarks |
|---|---|---|---|---|---|---|---|---|
| A | 675 | 60 | 810 | 90 | 100 | 5 | 30 | Comparative Steel |
| A | 688 | 60 | 800 | 90 | 100 | 5 | 30 | Steel of Invention |
| A | 690 | 60 | 805 | 90 | 100 | 5 | 30 | Steel of Invention |
| A | 653 | 60 | 800 | 90 | 100 | 5 | 30 | Comparative Steel |
| A | 620 | 60 | 810 | 90 | 100 | 5 | 30 | Comparative Steel |
| A | 650 | 60 | 820 | 90 | 100 | 5 | 30 | Steel of Invention |
| A | 650 | 60 | 815 | 90 | 100 | 5 | 30 | Steel of Invention |
| A | 640 | 60 | 820 | 90 | 100 | 5 | 30 | Steel of Invention |
| A | 620 | 60 | 815 | 90 | 100 | 5 | 30 | Steel of Invention |
| A | 630 | 60 | 842 | 90 | 100 | 5 | 30 | Steel of Invention |
| A | 652 | 60 | 812 | 90 | 100 | 5 | 30 | Steel of Invention |
| B | 630 | 60 | 800 | 90 | 100 | 5 | 30 | Steel of Invention |
| C | 620 | 60 | 800 | 90 | 100 | 6 | 30 | Steel of Invention |
| D | 600 | 60 | 820 | 90 | 100 | 7 | 30 | Steel of Invention |
| E | 620 | 60 | 800 | 90 | 100 | 5 | 30 | Steel of Invention |
| F | 615 | 60 | 815 | 90 | 100 | 8 | 30 | Steel of Invention |
| G | 600 | 60 | 820 | 90 | 100 | 6 | 30 | Steel of Invention |
| H | 620 | 60 | 820 | 90 | 100 | 5 | 30 | Steel of Invention |
| I | 620 | 60 | 835 | 90 | 100 | 5 | 30 | Steel of Invention |
| J | 640 | 60 | 820 | 90 | 100 | 5 | 30 | Steel of Invention |
| K | 670 | 60 | 820 | 90 | 100 | 4 | 30 | Steel of Invention |
| a | 680 | 60 | 820 | 90 | 100 | 7 | 30 | Comparative Steel |
| b | 685 | 60 | 800 | 90 | 100 | 5 | 30 | Comparative Steel |
| c | 686 | 60 | 800 | 90 | 100 | 6 | 30 | Comparative Steel |
| d | 686 | 60 | 805 | 90 | 100 | 6 | 30 | Comparative Steel |
| e | 620 | 60 | 810 | 90 | 100 | 5 | 30 | Comparative Steel |
| f | 650 | 60 | 790 | 90 | 100 | 7 | 30 | Comparative Steel |

Plating to Alloying

| Steel Species | (Immersion Sheet Temperature) − (Plating Bath Temperature)/°C | $\log(P_{H2O}/P_{H2})$ | Nitrogen Content/% | $W_{Fe}$/% | $(W_{Al}\cdot W_{Fe})$/% | Alloying Temperature/°C | Time Spent from Plating Bath to Alloying Furnace/s | Remarks |
|---|---|---|---|---|---|---|---|---|
| A | 10 | −3 | 96 | 0.025 | 0.10 | 540 | 1.5 | Steel of Invention |
| A | 10 | −3 | 90 | 0.025 | 0.10 | 540 | 1.5 | Comparative Steel |
| A | 10 | −3 | 96 | 0.025 | 0.10 | 540 | 1.5 | Comparative Steel |
| A | 10 | −3 | 96 | 0.025 | 0.10 | 540 | 1.5 | Comparative Steel |
| A | 10 | −3 | 96 | 0.025 | 0.10 | 540 | 1.5 | Comparative Steel |
| A | −50 | −1 | 96 | 0.025 | 0.08 | 540 | 1.5 | Comparative Steel |
| A | 60 | −6 | 96 | 0.025 | 0.09 | 540 | 1.5 | Comparative Steel |
| A | 10 | −3 | 96 | 0.070 | 0.05 | 540 | 1.5 | Comparative Steel |
| A | 10 | −3 | 96 | 0.005 | 0.40 | 540 | 1.5 | Comparative Steel |
| A | 10 | −3 | 96 | 0.025 | 0.10 | 430 | 1.5 | Comparative Steel |
| A | 10 | −3 | 96 | 0.025 | 0.25 | 490 | 1.5 | Steel of Invention |
| A | 10 | −3 | 96 | 0.025 | 0.15 | 590 | 1.5 | Steel of Invention |
| A | 10 | −3 | 96 | 0.025 | 0.10 | 620 | 1.5 | Comparative Steel |
| A | 10 | −3 | 96 | 0.025 | 0.10 | 520 | 10.0 | Comparative Steel |
| A | 10 | −2.5 | 96 | 0.025 | 0.10 | 540 | 1.5 | Steel of Invention |
| A | 10 | −4.5 | 96 | 0.025 | 0.10 | 540 | 1.5 | Steel of Invention |
| A | 10 | −3 | 96 | 0.015 | 0.10 | 540 | 1.5 | Steel of Invention |
| A | 10 | −3 | 96 | 0.040 | 0.10 | 540 | 1.5 | Steel of Invention |
| A | 10 | −3 | 96 | 0.025 | 0.10 | 540 | 1.5 | Steel of Invention |
| A | 10 | −3 | 96 | 0.025 | 0.10 | 540 | 1.5 | Steel of Invention |
| B | 10 | −3 | 96 | 0.025 | 0.10 | 530 | 1.5 | Steel of Invention |
| C | 10 | −3 | 96 | 0.025 | 0.10 | 520 | 1.5 | Steel of Invention |
| D | 10 | −3 | 96 | 0.025 | 0.10 | 520 | 1.5 | Steel of Invention |
| E | 10 | −3 | 96 | 0.025 | 0.10 | 520 | 1.5 | Steel of Invention |
| F | 10 | −3 | 96 | 0.025 | 0.10 | 520 | 1.5 | Steel of Invention |
| G | 10 | −3 | 96 | 0.025 | 0.10 | 520 | 1.5 | Steel of Invention |
| H | 10 | −3 | 96 | 0.025 | 0.10 | 520 | 1.5 | Steel of Invention |
| I | 10 | −3 | 96 | 0.025 | 0.10 | 520 | 1.5 | Steel of Invention |
| J | 40 | −3 | 96 | 0.025 | 0.11 | 600 | 6.0 | Steel of Invention |
| K | −30 | −3 | 96 | 0.025 | 0.08 | 440 | 6.0 | Steel of Invention |
| a | 10 | −3 | 96 | 0.025 | 0.10 | 650 | 1.5 | Comparative Steel |
| b | 10 | −3 | 96 | 0.025 | 0.10 | 520 | 1.5 | Comparative Steel |
| c | 10 | −3 | 96 | 0.025 | 0.10 | 520 | 1.5 | Comparative Steel |
| d | 10 | −3 | 96 | 0.025 | 0.10 | 520 | 1.5 | Comparative Steel |
| e | 10 | −3 | 96 | 0.025 | 0.10 | 520 | 1.5 | Comparative Steel |
| f | 10 | −3 | 96 | 0.025 | 0.10 | 520 | 1.5 | Comparative Steel |

Structure of Underlying Steel Sheet

| Steel Species | F/% | B/% | Retained γ/% | M/% | P/% | Tensile Strength/MPa | Remarks |
|---|---|---|---|---|---|---|---|
| A | 5 | 55 | 30 | 10 | 0 | 1056 | Steel of Invention |
| A | 40 | 49 | 5 | 5 | 1 | 853 | Comparative Steel |
| A | 41 | 42 | 10 | 5 | 2 | 820 | Comparative Steel |

TABLE 2-continued

| Steel Species | | | | | | | Remarks |
|---|---|---|---|---|---|---|---|
| A | <u>42</u> | 41 | <u>5</u> | 4 | 8 | <u>854</u> | Comparative Steel |
| A | <u>40</u> | 49 | <u>6</u> | 5 | 0 | <u>965</u> | Comparative Steel |
| A | 4 | 52 | 38 | 6 | 0 | 1110 | Comparative Steel |
| A | 3 | 50 | 41 | 6 | 0 | 1090 | Comparative Steel |
| A | 4 | 53 | 35 | 8 | 0 | 1010 | Comparative Steel |
| A | 5 | 51 | 32 | 12 | 0 | 1100 | Comparative Steel |
| A | <u>62</u> | <u>6</u> | 15 | <u>2</u> | 15 | 980 | Comparative Steel |
| A | 8 | 45 | 35 | 12 | 3 | 1120 | Steel of Invention |
| A | 10 | 50 | 25 | 15 | 0 | 1350 | Steel of Invention |
| A | <u>54</u> | <u>25</u> | <u>3</u> | <u>3</u> | 15 | <u>952</u> | Comparative Steel |
| A | <u>53</u> | <u>35</u> | 10 | <u>2</u> | 0 | 1020 | Comparative Steel |
| A | 32 | 52 | 15 | 1 | 0 | 995 | Steel of Invention |
| A | 32 | 53 | 12 | 0 | 0 | 1100 | Steel of Invention |
| A | 25 | 59 | 11 | 5 | 0 | 1230 | Steel of Invention |
| A | 5 | 60 | 25 | 10 | 0 | 1020 | Steel of Invention |
| A | 6 | 59 | 23 | 12 | 0 | 1150 | Steel of Invention |
| A | 8 | 58 | 24 | 10 | 0 | 1210 | Steel of Invention |
| B | 21 | 64 | 15 | 0 | 0 | 995 | Steel of Invention |
| C | 25 | 55 | 19 | 1 | 0 | 1010 | Steel of Invention |
| D | 20 | 60 | 19 | 1 | 0 | 1000 | Steel of Invention |
| E | 15 | 64 | 21 | 0 | 0 | 995 | Steel of Invention |
| F | 18 | 70 | 12 | 0 | 0 | 1015 | Steel of Invention |
| G | 19 | 63 | 18 | 0 | 0 | 1003 | Steel of Invention |
| H | 22 | 50 | 10 | 18 | 0 | 1105 | Steel of Invention |
| I | 32 | 49 | 18 | 1 | 0 | 995 | Steel of Invention |
| J | 21 | 54 | 17 | 5 | 3 | 1035 | Steel of Invention |
| K | 22 | 40 | 16 | 0 | 22 | 1023 | Steel of Invention |
| <u>a</u> | 16 | 43 | 14 | 25 | 2 | 1675 | Comparative Steel |
| <u>b</u> | <u>65</u> | <u>19</u> | 9 | <u>2</u> | 5 | <u>585</u> | Comparative Steel |
| <u>c</u> | <u>52</u> | 35 | <u>0</u> | <u>1</u> | 12 | <u>520</u> | Comparative Steel |
| <u>d</u> | <u>52</u> | 41 | <u>0</u> | 3 | 4 | <u>535</u> | Comparative Steel |
| <u>e</u> | 33 | 43 | <u>0</u> | 15 | 9 | 1520 | Comparative Steel |
| <u>f</u> | <u>51</u> | 42 | <u>0</u> | 2 | 5 | <u>525</u> | Comparative Steel |

| Steel Species | Plating Profile | | | | | | | |
|---|---|---|---|---|---|---|---|---|
| | (1) Γ1 Layer Thickness/ μm | (2) Γ Layer Thickness/ μm | ((1) + (2))/ μm | ((1)/(2)) | (3) ζ Layer Thickness + δ Layer Thickness/ μm | (3)/ [(1) + (2)] | Plating Adhesion | Remarks |
| A | 0.2 | 0.9 | 1.1 | 0.2 | 6.9 | 6.3 | A | Steel of Invention |
| A | 0.2 | 0.8 | 1.0 | 0.3 | 7.0 | 7.0 | C | Comparative Steel |
| A | 0.2 | 0.8 | 1.0 | 0.3 | 7.0 | 7.0 | C | Comparative Steel |
| A | 0.2 | 0.8 | 1.0 | 0.3 | 7.0 | 7.0 | C | Comparative Steel |
| A | 0.2 | 0.8 | 1.0 | 0.3 | 7.0 | 7.0 | C | Comparative Steel |
| A | 0.5 | 0.4 | 0.9 | <u>1.3</u> | 7.1 | 7.9 | C | Comparative Steel |
| A | 1.5 | 0.8 | <u>2.3</u> | <u>1.9</u> | 5.7 | 2.5 | C | Comparative Steel |
| A | 0.8 | 0.7 | <u>1.5</u> | <u>1.1</u> | 6.5 | 4.3 | C | Comparative Steel |
| A | 1.4 | 1.3 | <u>2.7</u> | <u>1.1</u> | 5.3 | 2.0 | C | Comparative Steel |
| A | 0.9 | 1.5 | <u>2.4</u> | <u>0.6</u> | 5.6 | 2.3 | C | Comparative Steel |
| A | 0.3 | 0.5 | 0.8 | 0.6 | 7.2 | 9.0 | A | Steel of Invention |
| A | 0.8 | 0.9 | 1.7 | 0.9 | 2.3 | 1.4 | B | Steel of Invention |
| A | 2.5 | 2.6 | <u>5.1</u> | 1.0 | 5.3 | 1.0 | C | Comparative Steel |
| A | 1.6 | 1.1 | <u>2.7</u> | 1.5 | 5.3 | 2.0 | C | Comparative Steel |
| A | 0.2 | 0.9 | 1.1 | 0.2 | 6.9 | 6.3 | A | Steel of Invention |
| A | 0.2 | 0.5 | 0.7 | 0.4 | 7.2 | 10.3 | A | Steel of Invention |
| A | 0.2 | 0.5 | 0.7 | 0.4 | 7.3 | 10.4 | A | Steel of Invention |
| A | 0.2 | 0.4 | 0.6 | 0.5 | 7.2 | 12.0 | A | Steel of Invention |
| A | 0.2 | 0.5 | 0.7 | 0.4 | 7.2 | 10.3 | A | Steel of Invention |
| A | 0.3 | 0.6 | 0.9 | 0.5 | 7.3 | 8.1 | A | Steel of Invention |
| B | 0.1 | 0.3 | 0.4 | 0.3 | 7.6 | 19.0 | A | Steel of Invention |
| C | 0.2 | 0.9 | 1.1 | 0.2 | 6.9 | 6.3 | A | Steel of Invention |
| D | 0.1 | 0.3 | 0.4 | 0.3 | 7.6 | 19.0 | A | Steel of Invention |
| E | 0.2 | 0.8 | 1.0 | 0.3 | 7.0 | 7.0 | A | Steel of Invention |
| F | 0.2 | 1.1 | 1.3 | 0.2 | 6.7 | 5.2 | A | Steel of Invention |
| G | 0.0 | 0.8 | 0.8 | 0.0 | 7.2 | 9.0 | A | Steel of Invention |
| H | 0.1 | 0.9 | 1.0 | 0.1 | 7.0 | 7.0 | A | Steel of Invention |
| I | 0.2 | 0.8 | 1.0 | 0.3 | 7.0 | 7.0 | A | Steel of Invention |
| J | 0.6 | 1.3 | 1.9 | 0.5 | 2.3 | 1.2 | B | Steel of Invention |
| K | 0.05 | 0.06 | 0.1 | 0.8 | 10.5 | 95.5 | B | Steel of Invention |
| <u>a</u> | 1.3 | 1.2 | <u>2.5</u> | 1.1 | 5.5 | 2.2 | C | Comparative Steel |
| <u>b</u> | 0.3 | 0.1 | 0.4 | 3.0 | 7.6 | 19.0 | C | Comparative Steel |
| <u>c</u> | 2.0 | 0.9 | <u>2.9</u> | <u>2.2</u> | 5.1 | 1.8 | C | Comparative Steel |
| <u>d</u> | 1.0 | 2.0 | <u>3.0</u> | 0.5 | 5.0 | 1.7 | C | Comparative Steel |
| <u>e</u> | 1.7 | 1.6 | <u>3.3</u> | <u>1.1</u> | 5.5 | 1.7 | C | Comparative Steel |
| <u>f</u> | 1.6 | 1.0 | <u>2.6</u> | <u>1.6</u> | 5.4 | 2.1 | C | Comparative Steel |

The letter underlined in bold denotes outside the scope according to the present invention.
F: Ferrite, B: bainite, γ: austenite, M: martensite, P: pearlite.

INDUSTRIAL APPLICABILITY

According to the present invention, a high-strength alloyed hot-dip galvanized steel sheet excellent in the plating adhesion may be provided. The production of the high-strength alloyed hot-dip galvanized steel sheet may be relatively easy and can be performed stably. Therefore, the high-strength alloyed hot-dip galvanized steel sheet according to the present invention may be optimal particularly as a steel sheet for automobiles pursuing weight reduction in recent years, and its industrial value may be remarkably high.

The invention claimed is:

1. An alloyed hot-dip galvanized steel sheet, which is a steel sheet comprising, in mass %,
   C: from 0.10 to 0.4%,
   Si: from 0.01 to 0.5%,
   Mn: from 1.0 to 3.0%,
   O: 0.006% or less,
   P: 0.04% or less,
   S: 0.01% or less,
   Al: from 0.1 to 3.0%, and
   N: 0.01% or less, with the balance being Fe and unavoidable impurities,
   wherein the structure of the steel sheet further comprises, in terms of volume fraction, 40% or more of the total content of bainite and martensite, from 8 to 60% of retained austenite, and less than 40% of ferrite, with the balance being an unavoidable structure, and alloying hot-dip galvanization is applied to the steel sheet surface;
   the alloyed hot-dip galvanized layer contains a $\Gamma 1$ layer;
   a total thickness of the thickness $T\gamma 1$ of the $\Gamma 1$ layer and the thickness $T\gamma$ of a $\Gamma$ layer in the alloyed hot-dip galvanized layer is 2 μm or less and the ratio ($T\gamma 1/T\gamma$) of thickness between a $\Gamma 1$ phase and a $\Gamma$ phase is 1 or less;
   the alloyed hot-dip galvanized layer contains a $\zeta$ layer and a $\delta$ layer; and
   the ratio $\{(T\zeta+T\delta)/(T\gamma 1+T\gamma)\}$ of the total thickness of thickness $T\zeta$ of the $\zeta$ layer and thickness $T\delta$ of the $\delta$ layer in the alloyed hot-dip galvanized layer to the total thickness of the $\Gamma 1$ layer and the $\Gamma$ layer is from 1.5 to 90.

2. The alloyed hot-dip galvanized steel sheet according to claim 1, wherein the steel sheet further comprises one member or two or more members of, in mass %,
   Cr: from 0.05 to 1.0%,
   Ni: from 0.05 to 1.0%,
   Cu: from 0.05 to 1.0%,
   Nb: from 0.005 to 0.3%,
   Ti: from 0.005 to 0.3%,
   V: from 0.005 to 0.5%,
   B: from 0.0001 to 0.01%,
   Ca: from 0.0005 to 0.04%,
   Mg: from 0.0005 to 0.04%,
   La: from 0.0005 to 0.04%,
   Ce: from 0.0005 to 0.04%, and
   Y: from 0.0005 to 0.04%.

* * * * *